Oct. 21, 1930.                    J. R. LONG                    1,779,177
                          UNIVERSAL FIRE HOSE NOZZLE
                              Filed Dec. 15, 1927
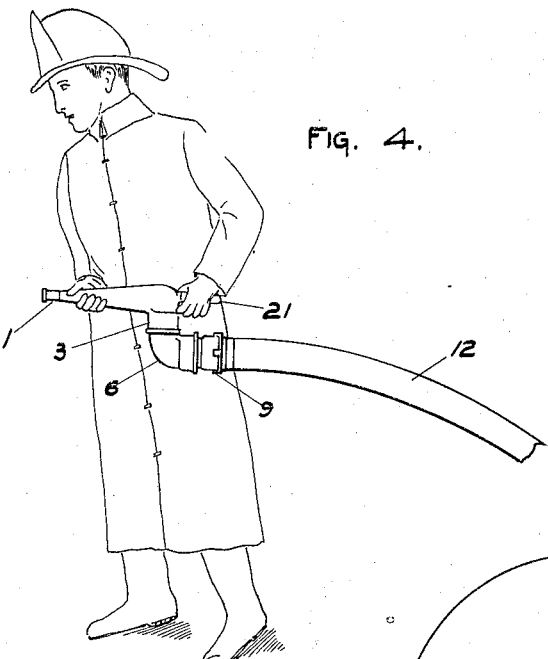
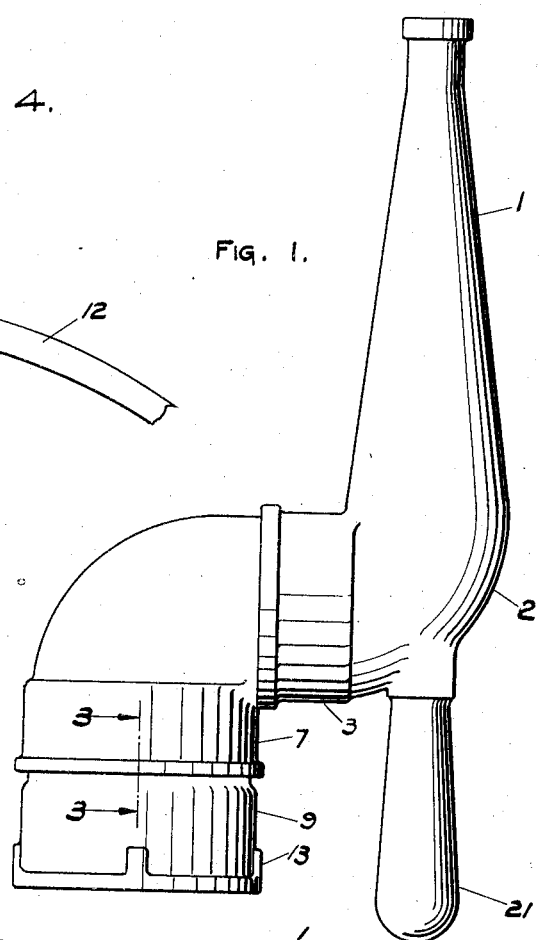
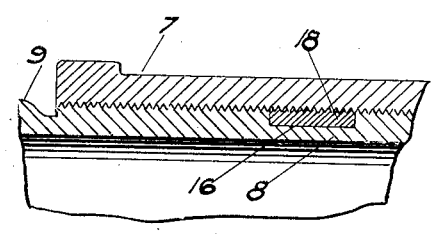
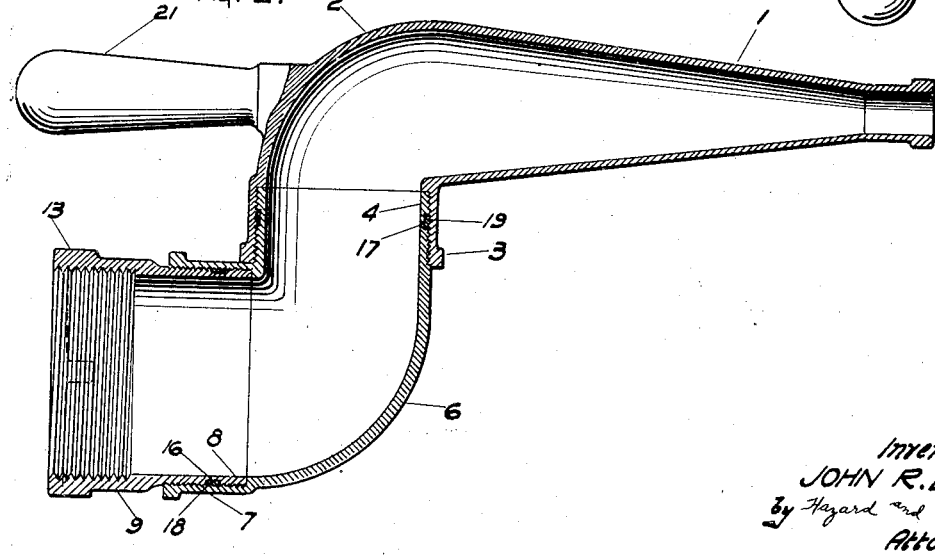
Inventor
JOHN R. LONG
by Hazard and Miller
Attorneys

UNITED STATES PATENT OFFICE

JOHN R. LONG, OF LOS ANGELES, CALIFORNIA

UNIVERSAL FIRE-HOSE NOZZLE

Application filed December 15, 1927. Serial No. 240,156.

This invention relates to nozzles, and more especially to a nozzle capable of universal movement in respect to the source of water pressure to which it is secured.

An object of the invention is the provision of a nozzle attachable to a source of water pressure and capable of universal movement in respect thereto.

Another object is the provision of a nozzle of the above described nature, having packing interposed between the various moving portions to prevent leakage of water therepast.

With the foregoing and other objects in view which will be made manifest in the following detailed description and specifically pointed out in the appended claims, reference is had to the accompanying drawings for an illustrative embodiment of the invention, wherein:

Figure 1 is a side elevation of the universal nozzle of my invention.

Fig. 2 is a longitudinal, medial, sectional view of the nozzle of Figure 1.

Fig. 3 is an enlarged, fragmentary, sectional view, the plane of section being indicated by the line 3—3 of Figure 1.

Fig. 4 is a perspective view showing the nozzle of my invention in actual use.

Referring to the accompanying drawings wherein similar reference characters designate similar parts throughout, the nozzle of my invention comprises a conical tube 1, shaped to conform to the conventional nozzle, except that its larger end 2 is curved through 90° and has a cylindrical portion 3 extending therefrom. The cylindrical portion 3 is provided with an inside thread to permit engagement with the male end 4 of an elbow 6; and the female end 7 of the elbow 6 is provided with an inside thread to permit engagement with the male end 8 of a coupling 9, the female end of which is preferably provided with inside threads to permit engagement with a source of water pressure such as a hose 12. Bosses 13 are provided around the outer circumference of the coupling 9 to facilitate engagement thereof with the hose 12. The threads between the coupling and elbow and the threads between the elbow and cylindrical portion, are preferably relatively fine and are running threads; i. e., they are of constant diameter throughout their length which is considerably extended so that many turns of one in respect to the other are required to disengage the two. The purpose of this is to provide a joint between the coupling and elbow and between the elbow and cylindrical portion, capable of rotation without longitudinal displacement. An annular groove 16 is provided in the threaded portion of the male end 8 of the coupling 9, and a similar groove 17 in the threaded portion of the male end 4 of the elbow 6. Within each of these grooves a ring 18 and 19 respectively, of preferably hard packing such as gutta-percha, ironwood, or similar packing material is provided. The outer circumference of each of the rings 18 and 19, preferably conforms to the inside threads of the elbow 6 and cylindrical portion 3 respectively, so as to establish water-tight joints. A handle 21 may be provided upon the tube 1, to facilitate its use.

In actual use as shown in Figure 4, the operator is enabled to keep both hands upon the nozzle, one upon the tube 1 and the other upon the handle 21. In changing the direction of the jet, the operator does not have to bend the hose 12 as has heretofore been the case, but merely to rotate the tube 1 upon the elbow 6 or the elbow 6 upon the coupling 9, or both, as the case might be, to produce the required change in direction. This will considerably facilitate the use of a nozzle handling a high pressure stream, because of the fact that the hose through which a stream is flowing at high pressure, is very difficult to bend. In fact, the use of the universal nozzle of my invention will make it possible for one man to handle a hose from which a jet is issuing, which heretofore required three or four men to hold.

It will be understood that various changes in the details of construction may be made without departing from the spirit or scope of the invention as defined by the appended claims.

I claim:

1. A universal nozzle comprising a coupling having an externally threaded male end, means for attaching the other end of said coupling to a source of water under pressure, an elbow having male and female ends, the female end being internally threaded complementarily to the male end of said coupling and screwed thereon, said male end of the elbow being externally threaded, and a nozzle having a female end disposed in angularity with the axis of the discharge orifice thereof, said female end of the nozzle being internally threaded complementarily to the male end of the elbow and screwed thereon, and the threaded connections between said coupling and elbow and between said elbow and nozzle being rotatably adjustable and sealed against leakage of water at high pressure.

2. A universal nozzle comprising a coupling having an externally threaded male end, means for attaching the other end of said coupling to a source of water under pressure, an elbow having male and female ends, the female end being internally threaded complementarily to the male end of said coupling and screwed thereon, said male end of the elbow being externally threaded, a nozzle having a female end disposed in angularity with the axis of the discharge orifice thereof, said female end of the nozzle being internally threaded complementarily to the male end of the elbow and screwed thereon, and the threaded connections between said coupling and elbow and between said elbow and nozzle being rotatably adjustable and sealed against leakage of water at high pressure, and a handle extending rigidly from the end of said nozzle opposite said orifice and in alignment with the axis thereof.

3. A universal nozzle comprising a coupling having an externally threaded male end, means for attaching the other end of said coupling to a source of water under pressure, an elbow having male and female ends, the female end being internally threaded complementarily to the male end of said coupling and screwed thereon, said male end of the elbow being externally threaded, a nozzle having a female end disposed in angularity with the axis of the discharge orifice thereof, said female end of the nozzle being internally threaded complementarily to the male end of the elbow and screwed thereon, and the threaded connections between said coupling and elbow and between said elbow and nozzle being rotatably adjustable and sealed against leakage of water at high pressure, each of said male ends having an annular groove therein, and a ring of packing disposed in each of said grooves.

In testimony whereof I have signed my name to this specification.

JOHN R. LONG.